United States Patent
Ide et al.

(10) Patent No.: US 8,004,950 B2
(45) Date of Patent: Aug. 23, 2011

(54) OPTICAL PICKUP, OPTICAL INFORMATION RECORDING AND REPRODUCING APPARATUS AND METHOD FOR OPTICALLY RECORDING AND REPRODUCING INFORMATION

(75) Inventors: Tatsuro Ide, Kawasaki (JP); Kenichi Shimada, Yokohama (JP); Masahiko Takahashi, Uenohara (JP); Takeshi Shimano, Yokohama (JP); Kevin R. Curtis, Longmont, CO (US); Ken E. Anderson, Boulder, CO (US)

(73) Assignees: Hitachi, Ltd., Tokyo (JP); InPhase Technologies Inc., Longmont, CO (US)

( * ) Notice: Subject to any disclaimer, the term of this patent is extended or adjusted under 35 U.S.C. 154(b) by 583 days.

(21) Appl. No.: 12/038,174

(22) Filed: Feb. 27, 2008

(65) Prior Publication Data
US 2008/0219128 A1     Sep. 11, 2008

Related U.S. Application Data

(60) Provisional application No. 60/905,837, filed on Mar. 9, 2007.

(51) Int. Cl.
*G11B 7/00* (2006.01)
(52) U.S. Cl. .............. 369/103; 369/13.28; 365/125
(58) Field of Classification Search ............ 369/103, 369/13.28; 385/37; 359/1, 19, 30, 35; 365/125, 365/216, 235, 126
See application file for complete search history.

(56) References Cited

U.S. PATENT DOCUMENTS

| | | | |
|---|---|---|---|
| 6,281,994 B1* | 8/2001 | Horikoshi et al. | 359/32 |
| 6,909,529 B2* | 6/2005 | Curtis | 359/30 |
| 2003/0095477 A1* | 5/2003 | Horimai et al. | 369/13.28 |
| 2004/0179251 A1 | 9/2004 | Anderson et al. | |
| 2005/0088947 A1* | 4/2005 | Ichihara et al. | 369/103 |
| 2005/0231775 A1* | 10/2005 | Kubota et al. | 359/15 |

FOREIGN PATENT DOCUMENTS

JP     2004-272268     9/2004

OTHER PUBLICATIONS

U.S. Appl. No. 60/905,838, filed Mar. 9, 2007, Shimada et al.
Ian Redmond : "Beam Delivery in Monocular Holographic Data Storage System", Technical Digest ODS (2006), MA1.
The InPhase Professional Archive Drive OMA: Design and Function, Redmond et al, Technical Digest ODS (2006) MA1.

* cited by examiner

*Primary Examiner* — William J Klimowicz
*Assistant Examiner* — Andrew J Sasinowski
(74) *Attorney, Agent, or Firm* — Antonelli, Terry, Stout & Kraus, LLP.

(57) ABSTRACT

An optical pickup for recording a hologram by using an angle multiplexing method. An optical beam is separated into two beams, a signal beam and a reference beam having different convergence/divergence degrees, by using an optical component such as a diffraction lens. The signal and reference beams are made incident upon the same objective, and the optical component or the objective lens is moved in a direction perpendicular to an optical axis, to thereby realize angle multiplex recording. If an optical information recording medium is inclined, the optical component or the objective lens is moved along the direction along which the optical information recording medium moved to change an angle of the reference beam incident upon the optical information recording medium and compensate for degradation of a reproduction signal.

16 Claims, 7 Drawing Sheets

MEDIUM INSERT → READY

READY → DATA RECORDING

READY → DATA REPRODUCING

OPTICAL PICKUP, OPTICAL INFORMATION RECORDING AND REPRODUCING APPARATUS AND METHOD FOR OPTICALLY RECORDING AND REPRODUCING INFORMATION

INCORPORATION BY REFERENCE

The present application claims priority from U.S. Provisional Patent Application Ser. No. 60/905,837 filed on Mar. 9, 2007, the content of which is hereby incorporated by reference into this application.

CROSS-REFERENCE TO RELATED APPLICATION

The present application relates to subject matter described in application Ser. No. 12/038,150 filed on Feb. 27, 2008, entitled "OPTICAL PICKUP, OPTICAL INFORMATION RECORDING APPARATUS AND OPTICAL INFORMATION recording and REPRODUCING APPARATUS USING THE OPTICAL PICKUP" by Kenichi SHIMADA, Tatsuro IDE, Kevin R. CURTIS and Ken E. ANDERSON, claiming priority from U.S. provisional application Ser. No. 60/905,838, filed on Mar. 9, 2007. The entire content of the related application is incorporated herein by reference.

BACKGROUND OF THE INVENTION

The present invention relates to an apparatus and holographic recording/reproducing method for recording information in an optical information recording medium and/or for reproducing information from the optical information recording medium, by using holography.

Optical mediums having a recording capacity of about 50 GB are now commercially available even for public use, which mediums use blue-violet semiconductor laser beams and rely upon Blu-Ray Disc (BD) specifications, High Definition Digital Versatile Disc (HD DVD) specifications and the like.

Now, optical discs that will have as large a capacity as Hard Medium Drive (HDD) having, e.g., 100 GB to 1 TB are desired.

However, in order to realize such an ultra high density of an optical medium, storage techniques of a new scheme are required which are different from conventional high density techniques which resort to a shorter wavelength and a high objective lens NA.

Researches of next generation storage techniques are under progress, and holographic recording techniques for recording digital information by utilizing holography have been paid attention.

The holographic recording techniques are techniques of superposing in a recording medium a signal beam having information on page data two-dimensionally modulated by a spatial light modulator (SLM) and a reference beam, and causing refraction index modulation in the recording medium in accordance with an interference fringe formed upon superposition to thereby record information in the recording medium.

For information reproduction, upon application of the reference beam used for recording to the recording medium at the same position, a diffraction beam is generated because holograms recorded in the recording medium function as diffraction grating. This diffraction beam is reproduced as the same beam as the recorded signal beam including phase information.

The reproduced signal beam is detected two-dimensionally at high speed with an optical detector such as CMOS and CCD. According to the holographic recording techniques, by using one hologram, two-dimensional information can be recorded/reproduced at the same time by using one hologram, and a plurality of sets of page data can be recorded in a superposed manner at the same position. It is therefore effective for recording/reproducing information of a large capacity at high speed.

Hologram recording techniques are described, for example, in JP-A-2004-272268 (Patent Document 1). This publication describes a so-called angle multiplexing method by which a signal beam is converged to an optical information recording medium via a lens, at the same time a reference beam as a parallel beam is applied to be interfered with the signal beam and record a hologram, and while an incidence angle of the reference beam upon the optical information recording medium is changed, different page data is displayed on a spatial light modulator to perform multiplex recording. This publication also describes the techniques that a space (pitch) between adjacent holograms can be made short by disposing an aperture or opening (spatial filter) at a beam waist of the signal beam converged by a lens so that recording capacity/density can be increased more than a conventional angle multiplexing method.

Technical Digest ODS (2006), MA1 (Non-Patent Document 1) by Ian Redmond describes that in reproducing information recorded in an optical information recording medium, a phase conjugate beam of a reference beam is used to dispose a photodetector for signal detection on the same side as other optical components relative to the optical information recording medium so that the apparatus can be made compact. In addition, since the signal beam propagates along the same optical path during both recording and reproducing, aberration generated on the optical path can be cancelled out so that good signal reproduction is possible.

SUMMARY OF THE INVENTION

In the case of the angle multiplexing method described in Patent Document 1 and Non-Patent Document 1, the signal beam and reference beam, after being separated into two beams by a beam splitter, propagate to the optical information recording medium via different optical paths. Therefore, the number of optical components is large and this method is not suited for compacting an optical system more than a conventional optical pickup such as BD. Further, since hologram utilizes light interference, it is necessary that the optical path length and wavefront are required to be coincident in the order of a wavelength order (shorter than several 10 nm) between the signal beam and reference beam. However, there occurs a shift of the wavefront and optical path of the signal beam and reference beam due to vibration and fluctuation of atmospheric air, and the quality of a signal to be recorded is degraded, posing a problem of difficulty in practical use.

The present invention is made in consideration of the above-described problem, and an object of the present invention is to provide an optical pickup which (1) is compact and (2) has a high reliability, an optical information recording/reproducing method and an optical information recording/reproducing apparatus.

In an optical pickup of the present invention, an optical beam emitted from a light source is separated into a first optical beam and a second optical beam, one of the optical beams is used as a signal beam and the other is used as a reference beam, and these beams are applied to an optical information recording medium to form an interference fringe for a hologram in the medium and record information. In performing this, the optical beam corresponding to the signal beam is applied to the optical information recording medium in a converged beam state, and the optical beam corresponding to the reference beam is applied to the optical information recording medium in a parallel beam state.

The present invention adopts a structure that the reference beam becomes incident upon the same lens as the lens (first lens) for converging the signal beam upon the optical information recording medium. It is necessary, however, as described above, that the reference beam is applied to the medium in the parallel beam state. To this end, in the present invention, a second lens for converging the reference beam upon the front focus plane of the converging lens is disposed on the optical path of the second beam, so that the reference beam can be applied to the medium in the parallel beam state. It is therefore possible for the signal beam and reference beam to share the optical path from the first lens to the optical information recording medium.

Further, it may adopt a structure that even after the optical signal is separated into the signal beam and reference beam, the beams propagate along the same optical axis. In this case, it is possible for the signal beam and reference beam to share the whole optical path from a light source to the optical information recording medium.

By using the optical pickup constructed as above, it becomes possible to achieve the above-described object (1) to realize a compact optical pickup.

Furthermore, the optical pickup of the present invention has means for correcting various influences to be caused by a variation in beam application conditions of an optical system. Factors of the variation in beam application conditions include, for example, an inclination of an optical information recording medium to be used in combination with the optical pickup adopting the present invention, a shift amount of a wavelength of an optical beam applied from a light source, and the like. It is therefore possible to achieve the above-described object (2) to realize a high reliability optical pick up.

A shape of an optical information recording medium to which the optical pickup of the present invention is applied is not specifically limited. For example, the optical information recording medium may have various shapes such as a disc and a card.

According to the present invention, since the signal beam and reference beam propagate along substantially the same optical path, it is advantageous in that an optical system can be made more compact than using a conventional angle multiplexing method. In addition, a recording quality of a signal can be improved drastically, because it is possible to mitigate a shift of the wavefront and optical path length of the signal beam and reference beam to be caused by vibrations, a fluctuation of atmospheric air and positional displacement of optical components during propagation. Further, degradation of a reproduction signal caused by inclination of the optical information recording medium can be corrected by driving a lens in a direction perpendicular to an optical axis. Furthermore, color aberration can be corrected by driving a lens in an optical axis direction.

These and other features, objects and advantages of the present invention will become more apparent from the following description when taken in conjunction with the accompanying drawings.

DETAILED DESCRIPTION OF THE EMBODIMENTS

Embodiments of the present invention will now be described with reference to the accompanying drawings.

First Embodiment

[Overall Structure of Holographic Information Recording/Reproducing Apparatus]

Figure 1:
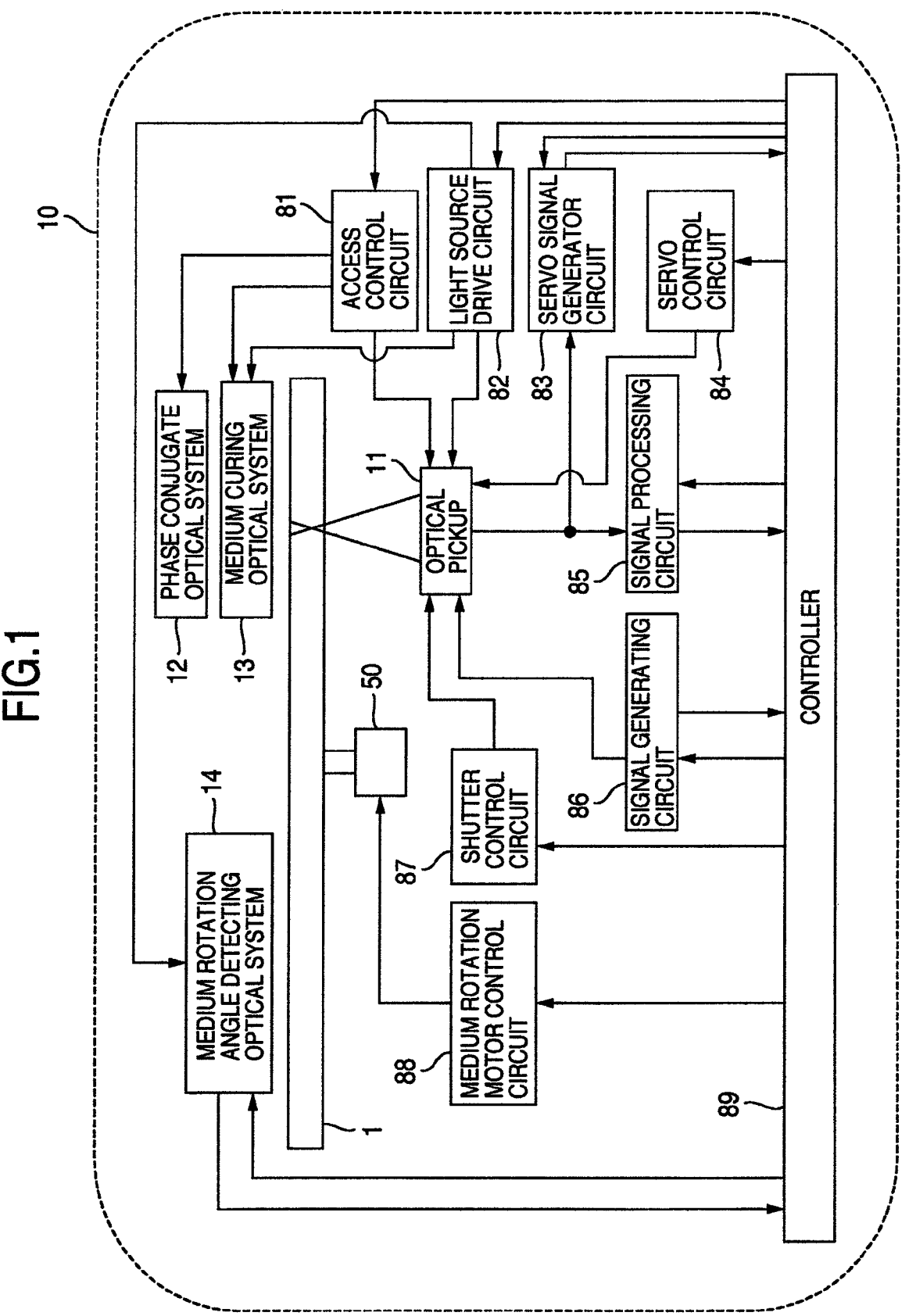
FIG. 1 is a schematic diagram showing a holographic information recording/reproducing apparatus according to an embodiment.

FIG. 1 shows the overall structure of a holographic information recording/reproducing apparatus for recording and/or reproducing digital information by utilizing holography.

A holographic information recording/reproducing apparatus 10 is constituted of an optical pickup 11, a phase conjugate optical system 12, a medium curing optical system 13, a medium rotation angle detecting optical system 14 and a rotation motor (spindle motor) 50. The optical information recording medium 1 is structured being able to be rotated by the rotation motor 50.

The optical pickup 11 has a role of recording digital information by applying a reference beam and a signal beam to the optical information recording medium 1 by utilizing holography.

In operation, a controller 89 operates to send an information signal to be recorded to a spatial light modulator in the optical pickup 11 to be described later via a signal generator circuit 86, and the signal beam is modulated by the spatial light modulator. An actuator in the optical pickup 11 to be described later is controlled by the controller 89 in accordance with a servo signal from a signal processing circuit 85. In reproducing information recorded in the optical information recording medium 1, a phase conjugate optical system 12 generates a phase conjugate beam of the reference beam emitted from the optical pickup 11. A phase conjugate beam is an optical beam having the same wavefront as that of the input beam and propagating in a direction opposite to that of the input beam. A reproduction beam reproduced by the phase conjugate beam is detected with a photodetector in the optical pickup 11 to be described later, and processed by a signal processing circuit 85.

An application time of the reference beam and signal beam applied to the optical information recording medium 1 can be adjusted in such a manner that the controller 89 controls an open/close time of a shutter in the optical pickup 11 to be described later via a shutter control circuit 87. Alternatively, a light source in the optical pickup 11 may be pulse-driven.

A medium curing optical system 13 has a role of generating an optical beam to be used for pre-cure and post-cure of the optical information recording medium 1. Pre-cure is a pre-process of, when information is to be recorded in the optical information recording medium 1 at a desired position, applying a predetermined optical beam before the reference beam and signal beam are applied to the desired position. Post-cure is a post-process of, after information is recorded in the optical information recording medium 1 at a desired position, applying a predetermined optical beam to the desired position in order to make unable to overwrite information at the desired position.

A medium rotation angle detecting optical system 14 is used for detecting a rotation angle of the optical information recording medium 1. In adjusting the optical information recording medium 1 to have a predetermined rotation angle, the medium rotation angle detecting optical system 14 detects a signal corresponding to a rotation angle, and by using the detected signal, the controller 89 can control a rotation angle of the optical information recording medium 1 via a medium rotation motor control circuit (spindle motor control circuit) 88.

A light source drive circuit 82 supplies a predetermined light source drive current to light sources in the optical pickup 11, medium curing optical system 13 and medium rotation angle detecting optical system 14, and each of the light sources can emit an optical beam having a predetermined light quantity.

The optical pickup 11, phase conjugate optical system 12 and medium curing optical system 13 have each a mechanism for sliding its position in a radial direction of the optical information recording medium 1, to perform position control via an access control circuit 81.

If the optical pickup 11, phase conjugate optical system 12 and medium curing optical system 13 are large and difficult to be slid, instead of sliding their positions in the radial direction of the optical information recording medium 1, the optical information recording medium 1 itself may be slid.

The holographic recording techniques utilizing holography utilize a strong wave number vector dependency of a diffraction efficiency on Bragg diffraction. There is therefore a tendency that an error allowance for an inclination (particularly an inclination in a Bragg diffraction direction) and a positional shift becomes extremely small. The optical pickup 11 may have a mechanism for detecting a shift quantity, e.g., a shift quantity having a small error allowance such as an inclination and a position shift of the optical information recording medium 1, and the optical information recording/reproducing apparatus 10 may have a servo mechanism in which a servo signal generator circuit 83 generates a servo control signal and a servo control circuit 84 corrects the shift quantity.

The optical pickup 11, phase conjugate optical system 12, medium curing optical system 13, and medium rotation angle detecting circuit 14 may be constituted of several optical system structures or may be constituted of one optical system structure integrating all optical system structures to simplify the structure.

Figure 2:
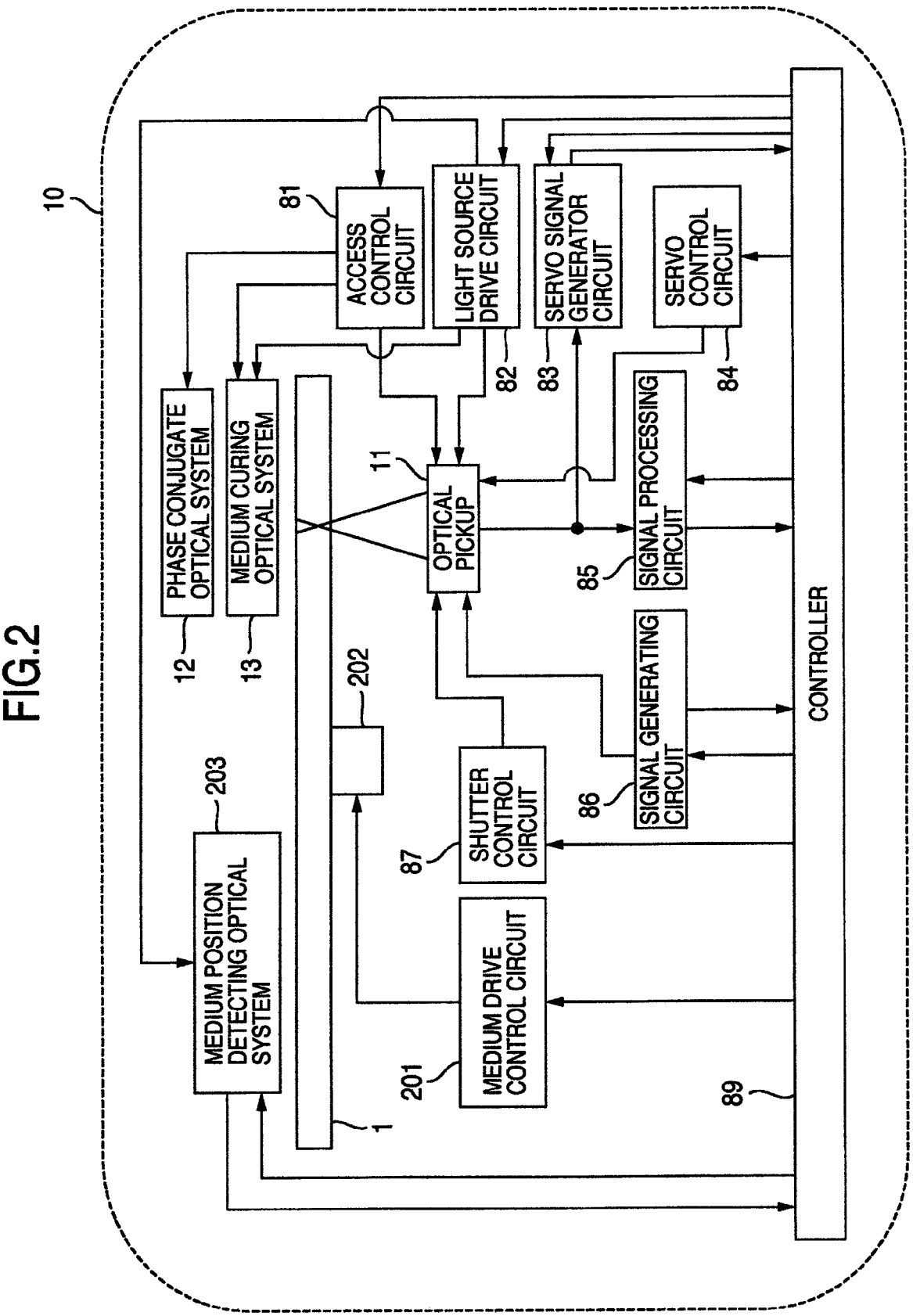
FIG. 2 is a schematic diagram showing a holographic information recording/reproducing apparatus according to an embodiment.

The optical information recording medium 1 is not limited to a disc shape, but it may be a card medium. FIG. 2 shows the overall structure of an information recording/reproducing apparatus using a card type medium. A holographic information recording/reproducing apparatus 10 is constituted of an optical pickup 11, a phase conjugate optical system 12, a medium curing system 13, a medium position detecting optical system 203 and a medium driving motor 202. The optical information recording medium 1 is structured to be able to be driven by the medium driving motor 202 via a medium driving control circuit 201 under control of the controller 89. The medium position detecting optical system 203 is used for detecting a position of the optical information recording medium 1. In FIG. 2, although the optical information recording medium 1 is driven, a mechanism for sliding the positions of the optical pickup 11, phase conjugate optical system 12 and medium curing optical system 13 may be used instead of driving the optical information recording medium 1, and position control is performed by using an access control circuit 81.

[Structure of Optical Pickup System]

Figure 3A:
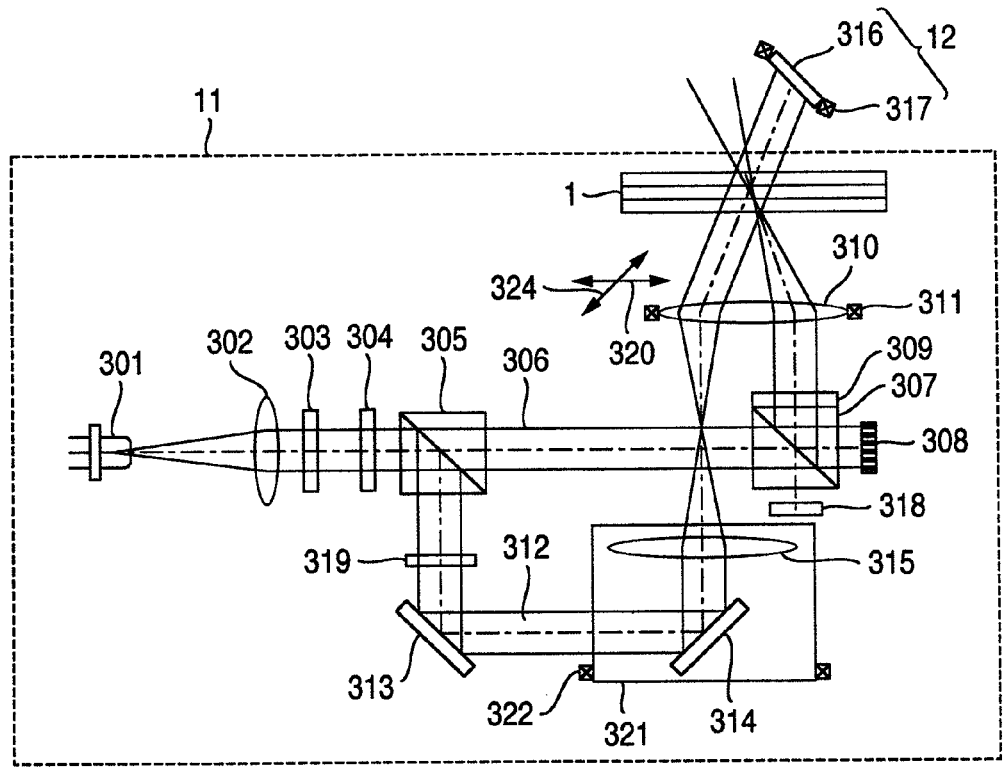
FIGS. 3A and 3B are schematic diagrams showing a pickup in the holographic information recording/reproducing apparatus according to an embodiment.
Figure 3B:
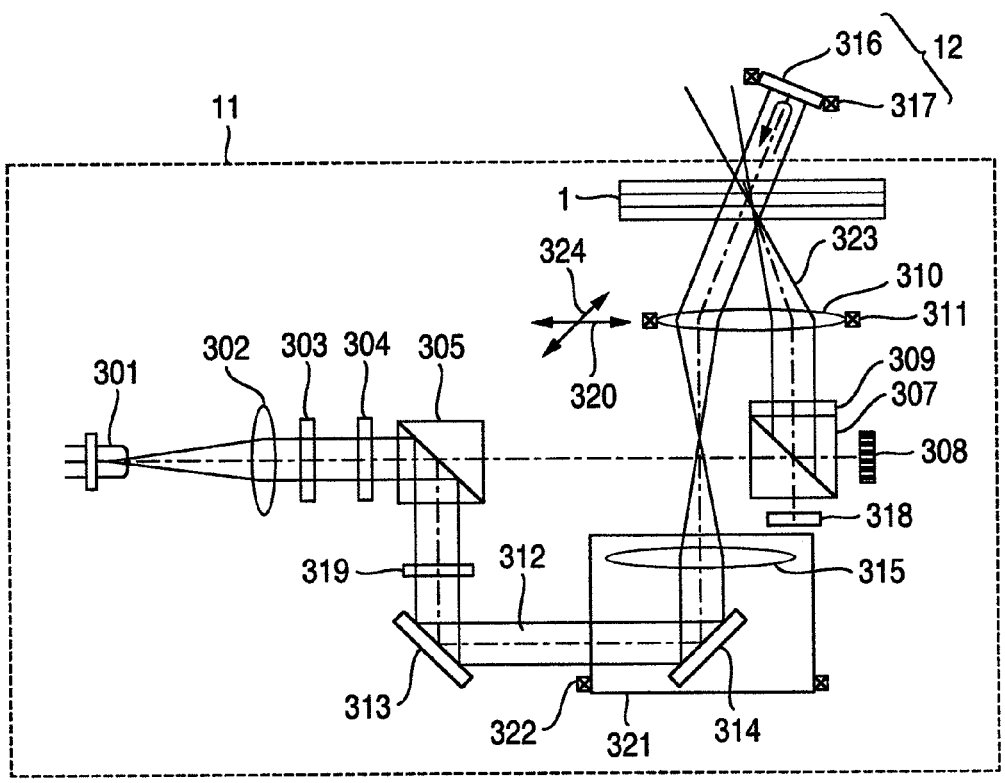

FIGS. 3A and 3B show an example of an optical system structure of the optical pickup 11 of the holographic information recording/reproducing apparatus 10. FIG. 3A shows a recording state. An optical beam emitted from a light source 301 transmits through a collimator lens 302 and becomes incident upon a shutter 303. While the shutter 303 is open, the optical beam passes through the shutter 303, and thereafter a polarization direction is controlled by a polarizing device 304 such as a half wave plate and a liquid crystal device to make the optical beam have a desired light amount ratio of a P polarized light beam to an S polarized light beam, and then the polarized light beams become incident upon a polarization beam splitter 305.

The signal beam (P polarized beam) passed through the polarization beam splitter 305 becomes incident upon a spatial light modulator 308 added with a quarter wave plate, via a polarization beam splitter 307. The spatial light modulator is a device capable of modulating an intensity, phase and polarization of light. A signal optical beam 306 intensity or phase modulated two-dimensionally by the spatial light modulator 308 is changed to a S-polarized beam which is reflected by the polarization beam splitter 307, and propagates through an angle filter 309 which allows only an optical beam having a predetermined incidence angle to pass. Thereafter, the signal optical beam 306 is converged upon an optical information recording medium 1 via an objective lens 310.

An optical beam (S polarized beam) reflected by the polarization beam splitter 305 functions as a reference beam 312, is made to have a polarization direction predetermined for recording/reproducing by a polarizing means 319 constituted of a half wave plate or the like, and thereafter becomes incident upon a lens 315 via mirrors 313 and 314. During recording, the polarizing means 319 makes the reference beam 312 pass as the S polarized beam same as the signal beam 306 in order to make the signal beam 306 and reference beam 312 interfere with each other on the optical information recording medium 1. The lens 315 takes a role of converging the reference beam 312 upon a back focus plane of the objective lens 310. The reference beam 312 converged once upon the back focus plane of the objective lens 310 is changed again to a generally parallel beam by the objective lens 310 same as that for the signal beam, and becomes incident upon the optical information recording medium 1. In this manner, an optical system structure same as that for the conventional angle multiplexing method can be realized in which the signal beam 306 as the converged beam and the reference beam 312 of generally the parallel beam become incident upon the optical information recording medium 1. Since the signal beam 306 and reference beam 312 become incident upon the same objective lens 310, the optical system can be made more compact than the angle multiplexing method described in Patent Document 1 and Non-Patent Document 1.

The objective lens 310 or an optical block 321 is provided with an objective lens actuator 311 or an optical block actuator 322. The actuators 311 and 322 can be driven in a predetermined coordinate system. For example, the actuators 311 and 322 can be driven along a direction 320 perpendicular to an optical axis of the objective lens. By displacing the position of the objective lens 310 or an optical block 321 along the drive direction 320, a relative positional relation between the objective lens 310 and the convergence point of the reference beam 312 on the back focus plane of the objective lens 310 changes. It is therefore possible to control an incidence angle of the reference beam 312 incident upon the optical information recording medium 1 to a desired angle.

In this way, by making the signal optical beam 306 and reference beam 312 incident upon the optical information recording medium 1 in a superposed manner, an interference fringe pattern is formed in the recording medium. By writing this pattern in the recording medium, information can be recorded. By displacing the position of the objective lens 310 or optical block 321 along the drive direction 320, the incidence angle of the reference beam 312 incident upon the optical information recording medium 1 can be changed so that angle multiplexing recording can be performed.

The polarizing means 304 and 319 can be realized, for example, by a liquid crystal device changing a polarization direction of incidence light with an applied voltage, a half wave plate having a rotation mechanism, insertion/detraction of a wavelength plate or the like.

In reproducing recorded information, as shown in FIG. 3B a whole optical beam emitted from the light source 301 is used as the reference beam. After the optical beam passes through the shutter 303, the optical beam is changed to an S polarized beam by the polarizing means 304, and the whole beam is reflected by the polarization beam splitter 305. In order to allow a reproduction beam 323 reproduced by the reference beam to reach the photodetector 318 as the P polarized beam, the reference beam 312 is changed to the P polarized beam by the polarizing means 319, and becomes incident upon the optical information recording medium 1 via the lens 315 and objective lens 310 in generally a parallel beam state. The reference beam 312 transmitted through the optical information recording medium 1 is reflected by a galvano mirror 316, and a phase conjugate beam of the reference beam 312 is formed. The reproduction beam (P polarized beam) 323 reproduced by the phase conjugate beam propagates through the objective lens 310 and angle filter 309. Thereafter, the reproduction beam 323 transmits through the polarization beam splitter 307 and becomes incident upon the photodetector 318 so that a recorded signal can be reproduced.

In reproducing a hologram angle-multiplexing-recorded, the objective lens 310 or optical block 321 is moved along a direction perpendicular to the optical axis indicated by reference numeral 320, and at the same time, an angle of the galvano mirror 316 is changed by the actuator 317 to make the reference beam reflect regularly.

Similar to the conventional angle multiplexing method, an adjacent hologram is also reproduced, which hologram was recorded by the reference beam 312 having the same incidence angle relative to the optical information recording medium 1. The reproduction beam of the target hologram propagates in parallel to the optical axis after passing through the objective lens 310, whereas the reproduction beam (stray beam) of the adjacent hologram propagates not in parallel to the optical axis after passing through the objective lens 310. Therefore, by setting the angle filter 309 in such a manner that only the wavefront generally in parallel to the optical axis is passed, the reproduction beam from the adjacent hologram can be removed. Although FIGS. 3A and 3B shows the structure that the stray beam from the adjacent hologram is removed by the angle filter 319, a polytopic angle multiplex structure may be adopted to remove a stray beam in which the reproduction beam 323 passed through the objective lens is once converged by a lens and a polytopic filter is disposed at the focal point.

As described earlier, holographic recording has a very small error allowance for an inclination of the optical information recording medium 1. If the optical information recording medium 1 inclines during angle multiplexing in a direction (in a plane of the drawing sheet of FIGS. 3A and 3B, hereinafter called a Bragg direction) optically parallel to the direction of moving the objective lens 310 or optical block 321, an incidence angle of the reference beam 312 upon the optical information recording medium 1 can be changed by shifting the position of the objective lens 310 or optical block 321 in the driving direction 320. It is therefore possible to compensate for degradation of the reproduction signal caused by the inclination of the optical information recording medium 1. If the optical information recording medium 1 inclines in a direction (a direction indicated by reference numeral 324, a direction perpendicular to the drawing sheet of FIGS. 3A and 3B, hereinafter called a Degenerate direction) perpendicular to the angle multiplexing direction, an incidence angle of the reference beam 312 upon the optical information recording medium 1 can be changed by moving the position of the objective lens 310 or optical block 321 in the direction perpendicular to the drawing sheet (a direction 324). It is therefore possible to compensate for degradation of the reproduction signal caused by the inclination of the optical information recording medium 1.

The angle filter 309 may be disposed between the polarization beam splitter 307 and photodetector 318.

The optical system shown in FIGS. 3A and 3B has an advantage that the system can be made more compact as compared to that for the conventional angle multiplexing method, by introducing the structure that the signal beam and reference beam are made incident upon the same objective lens. Further, angle multiplex recording can be realized by moving the objective lens or the converging lens for the reference beam vertically relative to the optical axis. Furthermore, by moving the objective lens or the converging lens for the reference beam in the Bragg direction or Degenerate direction, it is becomes possible to compensate for degradation of the reproduction signal caused by the inclination of the optical information recording medium 1 in that direction. The holographic recording/reproducing system of this structure is hereinafter called a Monocular system.

Second Embodiment

Figure 4A:
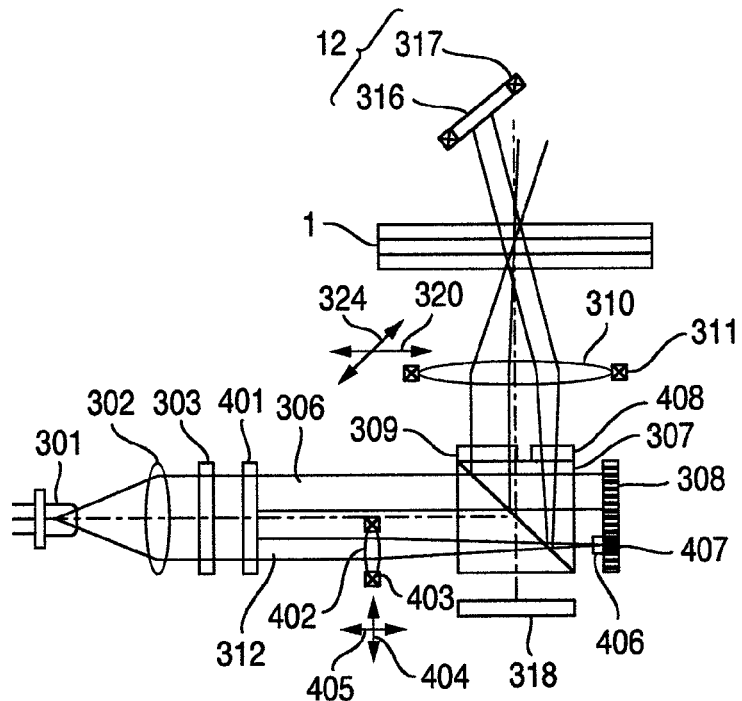
FIGS. 4A and 4B are schematic diagrams showing a pickup in the holographic information recording/reproducing apparatus according to an embodiment.
Figure 4B:
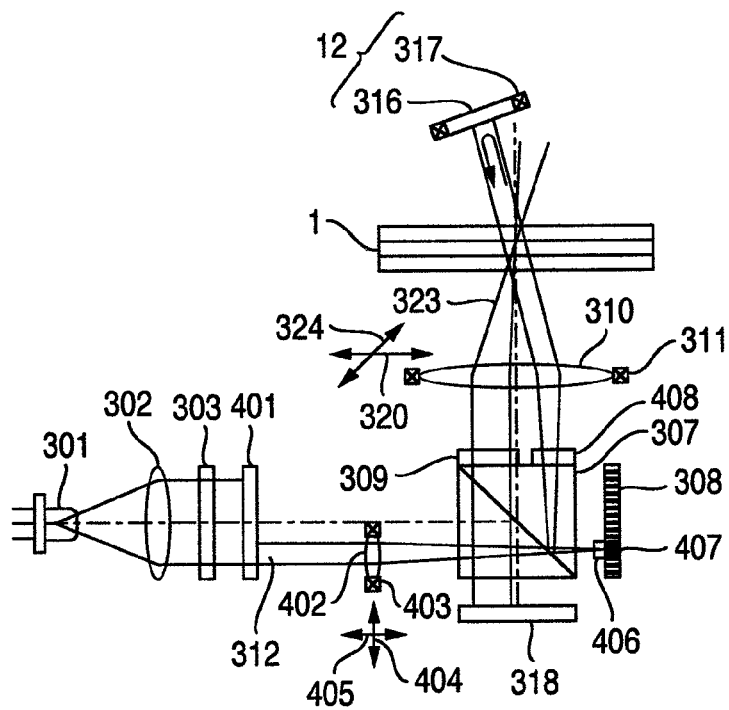

FIGS. 4A and 4B show another example of the optical system structure of the optical pickup 11 of the Monocular system shown in FIGS. 3A and 3B. FIG. 4A shows a recording state. An optical beam emitted from a light source 301 transmits through a collimator lens 302 and becomes incident upon a shutter 303. The shutter 303 has an aperture or opening through which light passes, and an optical transmission quantity can be adjusted by inserting and retracting a light shielding plate. While the shutter 303 is open, the optical beam passes through the shutter 303, and thereafter becomes incident upon a signal beam shutter 401. The optical beam incident upon the shutter 401 is subjected to area division such that a portion of the beam is for a reference beam 312 and another portion is for a signal beam 306.

The signal beam (P polarized beam) 306 passed through the polarization beam splitter 307 becomes incident upon a spatial light modulator 308 added with a quarter wave plate, via a polarization beam splitter 307. The signal beam 306 added with information by the spatial light modulator 308 changes to an S polarized beam, is reflected by the polarization beam splitter 307, and propagates through an angle filter 309 which allows only an optical beam having a predetermined incidence angle to pass. Thereafter, the signal optical beam 306 is converged upon an optical information recording medium 1 via an objective lens 310.

A reference beam (P polarized beam) 312 passes through the lens 402, and is converged upon a plane generally the same as the spatial light modulator 308 via the quarter wave plate 406. A reflection mirror 407 is disposed at the focal point, the reference beam 312 is reflected by the mirror 407, and thereafter transmits again through the quarter wave plate 406 to become an S polarized beam and is reflected by the polarization beam splitter 307. Thereafter, the reference beam is made to have a polarization direction predetermined for recording/reproducing by a polarizing means 408, and thereafter becomes incident upon the objective lens 310 same as the signal beam. During recording, the polarizing means 408 makes the reference beam 312 pass as the S polarized beam same as the signal beam 306 in order to make the signal beam 306 and reference beam 312 interfere with each other on the optical information recording medium 1. The reference beam 312 transmitted through the objective lens 310 becomes again generally a parallel beam and becomes incident upon the optical information recording medium 1. In this manner, an optical system structure can be realized in which the signal beam 306 as the converged beam and the reference beam 312 as generally the parallel beam become incident upon the optical information recording medium 1. Since the signal beam 306 and reference beam 312 become incident upon the same objective lens 310, the optical system can be made more compact than the angle multiplexing method described in Patent Document 1 and Non-Patent Document 1.

The objective lens 310 or a lens 402 can be driven in a direction indicated by reference numeral 320 or 404 perpendicular to the optical axis by the objective lens actuator 311 or actuator 403. By displacing the position of the objective lens 310 or a lens 402 along the drive direction 320 or 404, a relative positional relation between the objective lens 310 and the convergence point of the reference beam 312 on the mirror 407 changes. It is therefore possible to set an incidence angle of the reference beam 312 incident upon the optical information recording medium 1 to a desired angle.

Since the signal beam 306 and reference beam 312 are made incident upon the optical information recording medium 1 in a superposed manner, an interference fringe pattern is formed in the recording medium. By writing this pattern in the recording medium, information can be recorded. By displacing the position of the objective lens 310 or lens 402 along the drive direction 320 or 404, an incidence angle of the reference beam 312 incident upon the optical information recording medium 1 can be changed so that angle multiplexing recording can be performed.

In this embodiment, although the shutter 303 is a mechanical shutter inserting and retracting a light shielding plate, another shutter may be used which can adjust an optical transmission amount (in other words, a ratio of light passing through the shutter) by another mechanism such as an iris. An optical amount may also be adjusted by using a device changing an optical transmissivity with an applied voltage, such as a liquid crystal device. The angle filter 309 may be disposed between the polarization beam splitter 307 and photodetector 318.

The polarizing means 408 may be realized by a liquid crystal device changing an optical polarization direction with an applied voltage, a half wave plate having a rotation mechanism, insertion and retraction of a wave plate or the like. The polarizing means 408 may be a quarter wave plate disposed between the optical information recording medium 1 and galvano mirror 316 instead of that shown in FIGS. 4A and 4B. In this case, switching the polarization direction between recording and reproducing is unnecessary such as voltage application and rotation of the wave plate.

In reproducing recorded information, as shown in FIG. 4B the shutter 401 allows an optical beam emitted from the light source 301 to pass only the reference beam. The reference beam 312 transmits through the lens 402, and is converged upon generally the same plane as the spatial light modulator 308 via the quarter wave plate 406. The reference beam 312 is reflected by the mirror 407, thereafter transmits again through the quarter wave plate 406 to become an S polarized beam and be reflected by the polarization beam splitter 307. Thereafter, the reference beam 312 is made a P polarized beam by the polarizing means 408 so as to make the reproduction beam 323 reproduced by the reference beam 312 reach the photodetector 318 as the P polarized beam, and becomes incident upon the optical information recording medium 1 via the objective lens 310. By making the reference beam 312 transmitted through the optical information recording medium 1 be reflected by the galvano mirror 316, a phase conjugate beam of the reference beam is formed.

The reproduction beam (P polarized beam) 323 reproduced by the phase conjugate beam propagates through the objective lens 310 and angle filter 309. Thereafter, the reproduction beam 323 transmits through the polarization beam splitter 307 and becomes incident upon the photodetector 318 so that a recorded signal can be reproduced. In reproducing a hologram angle-multiplexing-recorded, the objective lens 310 or lens 402 is moved along a direction 320 or 404, and at the same time, an angle of the galvano mirror is changed by the actuator 317 to make the reference beam 312 reflect regularly.

Further, as described earlier, holographic recording has a very small error allowance for an inclination of the optical information recording medium 1. If the optical information recording medium 1 inclines in the angle multiplexing direction (in a plane of the drawing sheet of FIGS. 4A and 4B, a Bragg direction), an incidence angle of the reference beam 312 upon the optical information recording medium 1 can be changed by shifting the position of the objective lens 310 or lens 402 in the driving direction 320 or 404. It is therefore possible to compensate for degradation of the reproduction signal caused by the inclination of the optical information recording medium 1. If the optical information recording medium 1 inclines in a direction (a Degenerate direction, a direction 324, a direction perpendicular to the drawing sheet of FIGS. 4A and 4B), an incidence angle of the reference beam 312 upon the optical information recording medium 1 can be changed by moving the position of the objective lens 310 or lens 402 in the direction perpendicular to the drawing sheet. It is therefore possible to compensate for degradation of the reproduction signal caused by the inclination of the optical information recording medium 1.

In holographic recording, as the optical information recording medium 1 expands or contracts with an ambient temperature change, a pitch and inclination of recorded holograms (diffraction grating) change and a reproduction signal is deteriorated. In order to compensate for this, a wavelength of the light source 301 is shifted. However, if the wavelength is shifted, a focal distance of the lens 402 and objective lend 310 changes because of color aberration, and the reference beam 312 transmitted through the objective lens 310 does not become a parallel beam. The reference beam 312 incident upon the optical information recording medium 1 is desired to be a parallel beam in the angle multiplexing system. In order to solve this, a feedback mechanism for moving the lens 402 and objective lens 310 in the optical axis direction 405 is additionally used to perform color aberration correction in accordance with a wavelength shift amount of the light source 301. Generally, a color aberration of a lens is given by the following formula:

$$\partial f/\partial \lambda \approx -[(\partial n/\partial \lambda)/(n-1)] \times f$$

where f is a focal distance, n is a refractive index of glass material, and $\lambda$ is a wavelength of a light source. For example, if $\lambda$ is 405 nm, a glass material is BK7 (n=1.5302, dn/d$\lambda$=1.27×10$^{-4}$), a focal distance f is 20 nm, and a wavelength shift is $\Delta\lambda$=5 nm, then a change amount of a focal distance is $\Delta f$=24 μm.

Third Embodiment

Figure 5A:
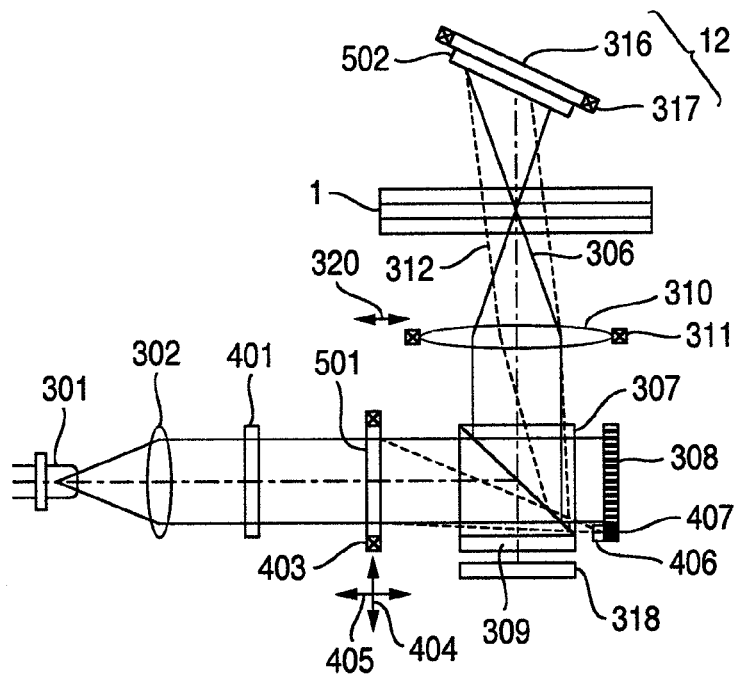
FIGS. 5A and 5B are schematic diagrams showing a pickup in the holographic information recording/reproducing apparatus according to an embodiment.
Figure 5B:
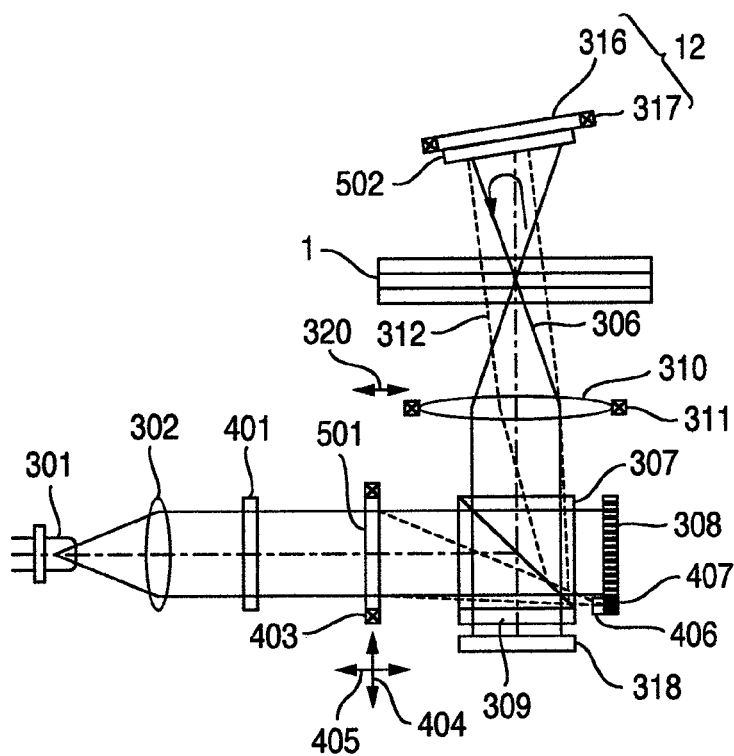

FIGS. 5A and 5B show another example of the optical system structure of the optical pickup 11 of the Monocular system shown in FIGS. 3A and 3B. Description will be omitted on the same function as that of the optical system of the optical pickup 11 of the Monocular system shown in FIGS. 4A and 4B. FIG. 5A shows a recording state. An optical beam is separated by an optical component 501 into a parallel beam as the signal beam 306 and a converged beam as the reference beam 312 indicated by a broken line. For example, the optical component 501 is a diffraction lens 601 shown in FIG. 6 and uses a 0-th order beam as the signal beam and a 1-st order diffraction beam as the reference beam. In this structure, the 0-th order beam may be used as the reference beam and the 1-st order diffraction beam as the signal beam. By using the 0-th order beam and 1-st order diffraction beam either as the signal beam or as the reference beam in the above manner, an optical pickup can be realized which is excellent in a light usage efficiency and optical reliability. The reference beam 312 transmits through a quarter wave plate 406 disposed on the optical path of the 1-st order diffraction beam, and becomes incident upon a mirror 407 having generally the same plane as that of a spatial light modulator 308. The signal beam 306 modulated by the spatial light modulator 308 and the reference beam 312 reflected by the mirror 407 become an S polarized beam which is reflected by a polarization beam splitter 307 and becomes incident upon the objective lens 310. The signal beam 306 transmitted through the objective lens 310 is converged upon the optical information recording medium 1, and the reference beam 312 is applied to the optical information recording medium 1 as the parallel beam.

In reproducing recorded information, as shown in FIG. 5B the reference beam 312 becomes incident upon the optical information recording medium 1 in the S polarized beam state via the optical component 501, polarization beam splitter 307, mirror 407 and objective lens 310. The reference beam 312 transmitted through the optical information recording medium 1 transmits through the quarter wave plate 502, is regularly reflected by the galvano mirror 316, again transmits through the quarter wave plate 502, and becomes incident upon the optical information recording medium 1 as a P polarized beam.

A reproduction beam (P polarized beam) 323 reproduced by the phase conjugate beam transmits through the objective lens 310, polarization beam splitter 307 and angle filter 309, and becomes incident upon the photodetector 318 so that the recorded signal can be reproduced. Since the signal beam 306 is not necessary during reproduction, the spatial light modulator 308 is turned off to remove a reflection beam or a shutter is disposed between the polarization beam splitter 307 and spatial light modulator 308.

Figure 6:
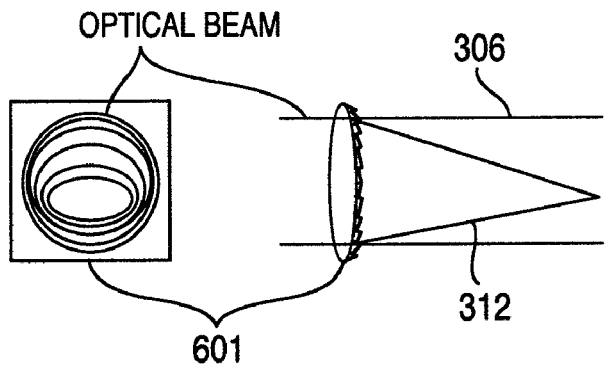
FIG. 6 is a diagram showing an example of a diffraction lens realizing the present invention.
Figure 7:
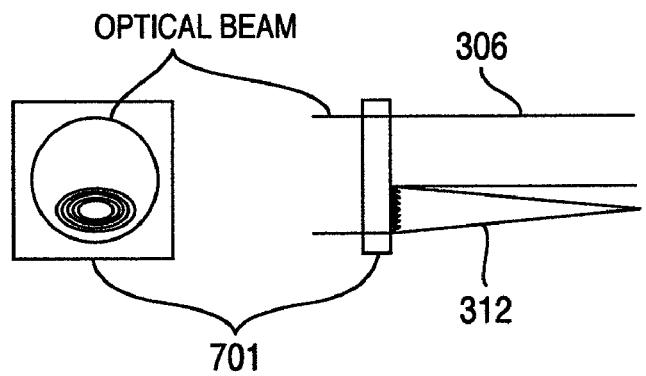
FIG. 7 is a diagram showing an example of a diffraction lens realizing the present invention.
Figure 8:
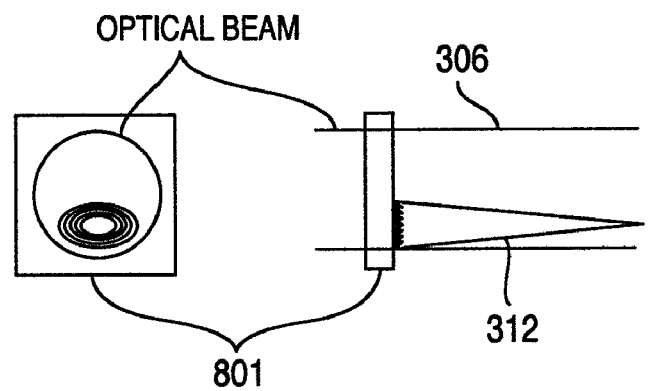
FIG. 8 is a diagram showing an example of a diffraction lens realizing the present invention.

In FIG. 6, although the whole optical beam incident upon the diffraction lens 601 is separated into the signal beam 306 and reference beam 312, for example, the optical component 501 may be a diffraction lens 701 shown in FIG. 7 and the area of the diffraction lens 701 may be separated completely for the signal beam and reference beam. Alternatively, the optical component 501 may be a diffraction lens 801 shown in FIG. 8 and a beam transmitted partially through the diffraction lens 801 is used as the reference beam.

Fourth Embodiment

[Operation Flows]

Figure 9A:
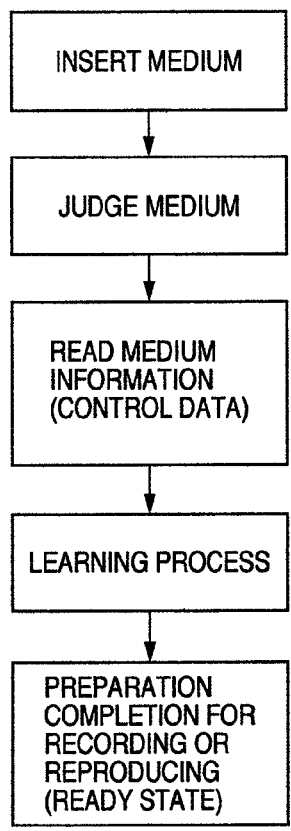
FIGS. 9A to 9C are schematic diagrams illustrating operation flows of a holographic information recording/reproducing apparatus.
Figure 9B:
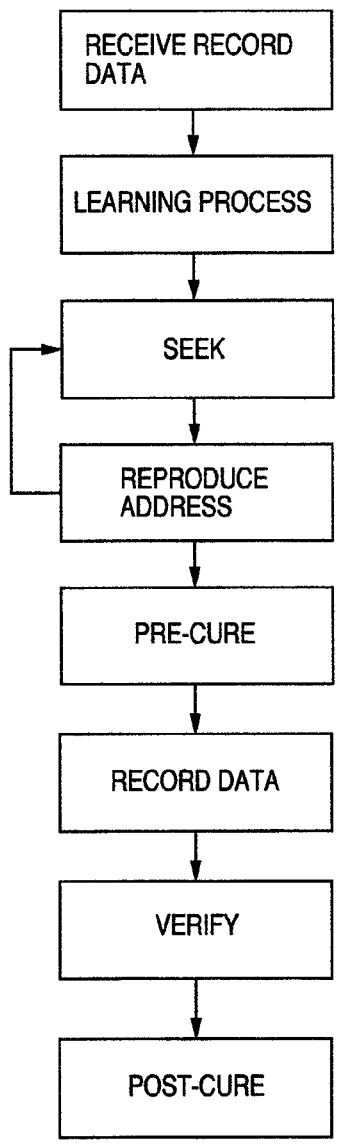
Figure 9C:
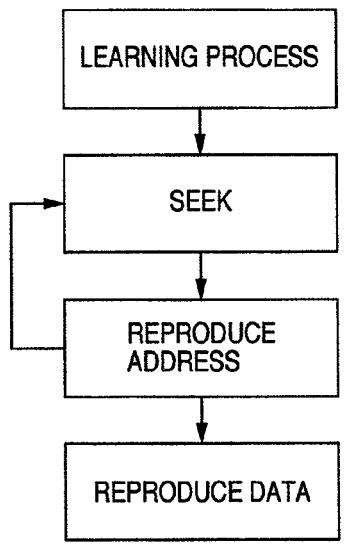

FIGS. 9A to 9C show recording/reproducing operation flows of the holographic information recording/reproducing apparatus 10 (refer to FIG. 1 or 2) mounting the optical pickup described in the first to third embodiments.

FIG. 9A shows an operation flow from insertion of the optical information recording medium 1 into the optical information recording/reproducing apparatus 10 to completion of preparation for recording or reproducing, FIG. 9B shows an operation flow from the preparation completion state to recording information in the optical information recording medium 1, and FIG. 9C shows an operation flow from the preparation completion state to reproducing information recorded in the optical information recording medium 1.

As shown in FIG. 9A, as a medium is inserted, the holographic information recording/reproducing apparatus 10 reads control data provided in the optical information recording medium 1, to acquire, for example, information on the optical information recording medium 1 and information on various setting conditions during recording and reproducing.

After the control data is read, various adjustments corresponding to the control data and learning processes for the optical pickup 11 are performed so that the holographic information recording/reproducing apparatus 10 completes preparation for recording or reproducing.

In the operation flow from the preparation completion state to recording information, as shown in FIG. 9B data to be recorded is first received, and information corresponding to the received data is sent to the spatial light modulator in the optical pickup 11.

Thereafter, various learning processes are executed beforehand if necessary in order to allow high quality information to be recorded in the optical information recording medium 1, and while a seek operation and an address reproduction operation are repetitively performed, the optical pickup 11 and medium curing optical system 13 are disposed at predetermined positions of the optical information recording medium 1.

Thereafter, by using an optical beam emitted from the medium curing optical system 13, a predetermined area is pre-cured, and data is recorded by using a reference beam and a signal beam emitted from the optical pickup 11.

After the data is recorded, data is verified if necessary, and post-cure is performed by using an optical beam emitted from the medium curing optical system 13.

In the operation flow from the preparation completion state to reproducing information, as shown in FIG. 9C various learning processes are executed beforehand if necessary in order to allow high quality information to be reproduced from the optical information recording medium 1. Thereafter, while a seek operation and an address reproduction operation are repetitively performed, the optical pickup 11 and phase conjugate optical system 12 are disposed at predetermined positions of the optical information recording medium 1.

Thereafter, by making the optical pickup 11 emit a reference beam, information recorded in the optical information recording medium 1 is read.

According to the holographic recording/reproducing apparatus of the embodiment, since the signal beam and reference beam propagate generally the same optical path, it is advantageous in making more compact the optical system than using the conventional angle multiplexing method. In addition, a recording quality of a signal can be improved drastically, because it is possible to mitigate a shift of the wavefront and optical path length of the signal beam and reference beam to be caused by vibrations, a fluctuation of atmospheric air and positional displacement of optical components during propagation. Further, degradation of a reproduction signal caused by inclination of the optical information recording medium can be corrected by driving a lens in a direction perpendicular to an optical axis. Furthermore, color aberration to be caused by a wavelength shift can be corrected by driving a lens in an optical axis direction.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications which fall within the ambit of the appended claims.

The invention claimed is:

1. An optical pickup to be used in combination with an optical information recording medium, comprising:
   a light source;
   means for separating an optical beam emitted from said light source into a first optical beam and a second optical beam;
   a spatial light modulator for receiving said first optical beam;
   a first lens for converging said first optical beam modulated by said spatial light modulator; and
   a second lens for converging said second optical beam upon a back focus plane of said first lens,
   wherein:
   said first optical beam transmitted through said first lens is applied as a signal beam to said optical information recording medium in a converged optical beam state;
   said second optical beam transmitted through said first lens is applied as a reference beam to said optical information recording medium in a parallel beam state;
   said signal beam and said reference beam are optically interfered with each other on said optical information recording medium, and an interference fringe formed by said interference is recorded as a hologram in said optical information recording medium; and
   said second lens and said means for separating into said first and second beams is one diffraction lens.

2. The optical pickup according to claim 1, wherein:
   said means for separating into said first and second optical beams has first and second areas for transmitting incident light upon said separating means.

3. The optical pickup according to claim 2, wherein:
   said signal beam passes through said first area;
   said reference beam passes through said second area;
   when information recorded in said optical information recording medium is reproduced, a transmissivity of said first area is substantially zero; and
   when information is recorded in said optical information recording medium the tramsmissivity of said first area is made higher than during reproduction.

4. The optical pickup according to claim 1, wherein:
   a 0-th order beam of an optical beam incident upon said diffraction lens is used as said signal beam; and
   a diffraction beam of the optical beam incident upon said diffraction lens is used as said reference beam.

5. The optical pickup according to claim 1, wherein:
   a diffraction beam of an optical beam incident upon said diffraction lens is used as said signal beam; and
   a 0-th order beam of the optical beam incident upon said diffraction lens is used as said reference beam.

6. The optical pickup according to claim 1, wherein:
   the optical pickup further comprises means for driving a position of said first lens or said second lens; and
   an incidence angle of said reference beam upon said optical information recording medium is changed by moving said first lens or said second lens along a direction perpendicular to a lens optical axis by said driving means, to thereby realize angle multiplexing of a hologram to be recorded in said optical information recording medium.

7. The optical pickup according to claim 1, wherein when a hologram recorded in said optical information recording medium is reproduced, a phase conjugate beam of said reference beam or said signal beam is applied to said optical information recording medium to generate a reproduction beam of the hologram recorded in said optical information recording medium.

8. The optical pickup according to claim 7, wherein an angle filter is disposed for said reproduction beam.

9. The optical pickup according to claim 1, further comprises:
   a light shielding mechanism disposed between said spatial light modulator and said optical information recording medium; and
   when said hologram is reproduced, said signal beam is shielded by said optical information recording medium.

10. The optical pickup according to claim 1, wherein when said hologram is reproduced, a reflection coefficient is set approximately to zero to shield said signal beam.

11. The optical pickup according to claim 1, wherein the optical pickup further comprises means for correcting and driving a position of said first lens or said second lens along a direction optically parallel to a straight line crossing a plane perpendicular to a lens optical axis and a plane including an inclination of said optical information recording medium, in accordance with the inclination of said optical information recording medium relative to a reference position.

12. The optical pickup according to claim 1, further comprising means for correcting and driving a position of said first lens or said second lens along a lens optical axis, in accordance with a shift amount of a wavelength of said light source from a reference wavelength.

13. The optical pickup according to claim 1, wherein said one diffraction lens spatially separates said optical beam emitted from said light source into said first optical beam and said second optical beam so that said first optical beam and said second optical beam have different light-converged points.

14. An optical information recording method of recording an interference fringe in an optical information recording medium as a hologram, comprising steps of:

separating an optical beam generated by a light source into first and second optical beams;

performing intensity modulation of said first optical beam, and applying said first optical beam as a convergence beam to said optical information recording medium by using a lens;

converging said second beam upon a back focus plane of said lens, and applying said second beam as a parallel beam to said optical information recording medium by using said lens; and forming an interference fringe on said optical information recording medium through application of said convergence beam and said parallel beam;

wherein the steps of separating said optical beam generated by a light source into first and second optical beams and of converging includes separating said optical beam into spatially separated first and second optical beams and for converging at least said second optical beam to a different light converged point from a light converged point of said first optical beam using one diffraction lens.

15. An optical information recording/reproducing apparatus comprising:

an optical information recording medium to which a hologram is recorded by using an interference beam; and an optical pickup for recording or reproducing said hologram, wherein said optical pickup comprises:

a light source;

means for separating an optical beam emitted from said light source into a first optical beam and a second optical beam;

a spatial light modulator for receiving said first optical beam;

a first lens for converging said first optical beam modulated by said spatial light modulator; and a second lens for converging said second optical beam upon a back focus plane of said first lens, wherein:

said first optical beam transmitted through said first lens is applied as a signal beam to said optical information recording medium in a converged optical beam state;

said second optical beam transmitted through said first lens is applied as a reference beam to said optical information recording medium in a parallel beam state;

said signal beam and said reference beam are optically interfered with each other on said optical information recording medium, and an interference fringe formed by said interference is recorded as a hologram in said optical information recording medium; and said second lens and said means for separating into said first and second beams is one diffraction lens.

16. The optical pickup according to claim 15, wherein said one diffraction lens spatially separates said optical beam emitted from said light source into said first optical beam and said second optical beam so that said first optical beam and said second optical beam have different light-converged points.

* * * * *